United States Patent
McClung et al.

(10) Patent No.: US 7,182,111 B2
(45) Date of Patent: Feb. 27, 2007

(54) FUEL-DISPENSING NOZZLE INHIBITOR

(75) Inventors: Chad A. McClung, Connersville, IN (US); Kevin M. Frank, Connersville, IN (US); Wayne O. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 43 days.

(21) Appl. No.: 11/196,987

(22) Filed: Aug. 4, 2005

(65) Prior Publication Data

US 2006/0032549 A1 Feb. 16, 2006

Related U.S. Application Data

(60) Provisional application No. 60/600,757, filed on Aug. 11, 2004.

(51) Int. Cl.
*B65B 1/04* (2006.01)
(52) U.S. Cl. .................. 141/352; 141/301; 141/349; 141/351; 220/86.2
(58) Field of Classification Search .............. 141/2, 141/18, 301, 302, 348–352, 367, 368; 220/86.2, 220/DIG. 33; 137/588
See application file for complete search history.

(56) References Cited

U.S. PATENT DOCUMENTS

| | | | |
|---|---|---|---|
| 3,730,216 A * | 5/1973 | Arnett et al. ............... 137/588 |
| 4,034,784 A | 7/1977 | Ball et al. | |
| 4,248,279 A | 2/1981 | Warmbold | |
| 4,526,216 A * | 7/1985 | Lake, Jr. .................... 141/348 |
| 4,687,034 A | 8/1987 | Graiff et al. | |
| 5,212,864 A | 5/1993 | Bates et al. | |
| 5,322,100 A | 6/1994 | Buechler et al. | |
| 5,385,179 A | 1/1995 | Bates et al. | |
| 5,439,129 A | 8/1995 | Buechler | |
| 5,465,861 A * | 11/1995 | Kunz et al. ................. 220/260 |
| 5,715,963 A * | 2/1998 | Boll et al. .................. 220/86.2 |
| 6,302,169 B1 | 10/2001 | Pulos | |
| 6,382,270 B1 | 5/2002 | Gzik | |
| 6,539,990 B1 | 4/2003 | Levey et al. | |
| 6,607,014 B2 | 8/2003 | Webb | |
| 6,968,874 B1 * | 11/2005 | Gabbey et al. ............. 141/349 |
| 6,994,130 B1 * | 2/2006 | Gabbey et al. ............. 141/371 |
| 7,077,178 B2 * | 7/2006 | Hedevang ................... 141/367 |
| 2002/0020465 A1 | 2/2002 | Gzik | |
| 2002/0170622 A1 | 11/2002 | Webb | |
| 2004/0025967 A1 | 2/2004 | Henry | |
| 2005/0000592 A1 | 1/2005 | Bartlett | |
| 2006/0096662 A1 * | 5/2006 | King et al. ................ 141/367 |
| 2006/0237472 A1 * | 10/2006 | Martin et al. ............... 220/812 |

\* cited by examiner

*Primary Examiner*—Timothy L. Maust
(74) *Attorney, Agent, or Firm*—Barnes & Thornburg LLP

(57) ABSTRACT

A nozzle inhibitor is positioned in a filler neck closure assembly between a pivotable outer door and a pivotable inner door to prevent a user from pumping unleaded fuel into a diesel fuel tank. The nozzle inhibitor blocks full insertion of a small-diameter unleaded fuel nozzle into the filler neck closure assembly yet allows full insertion of a large-diameter diesel fuel nozzle into the filler neck closure assembly.

22 Claims, 4 Drawing Sheets

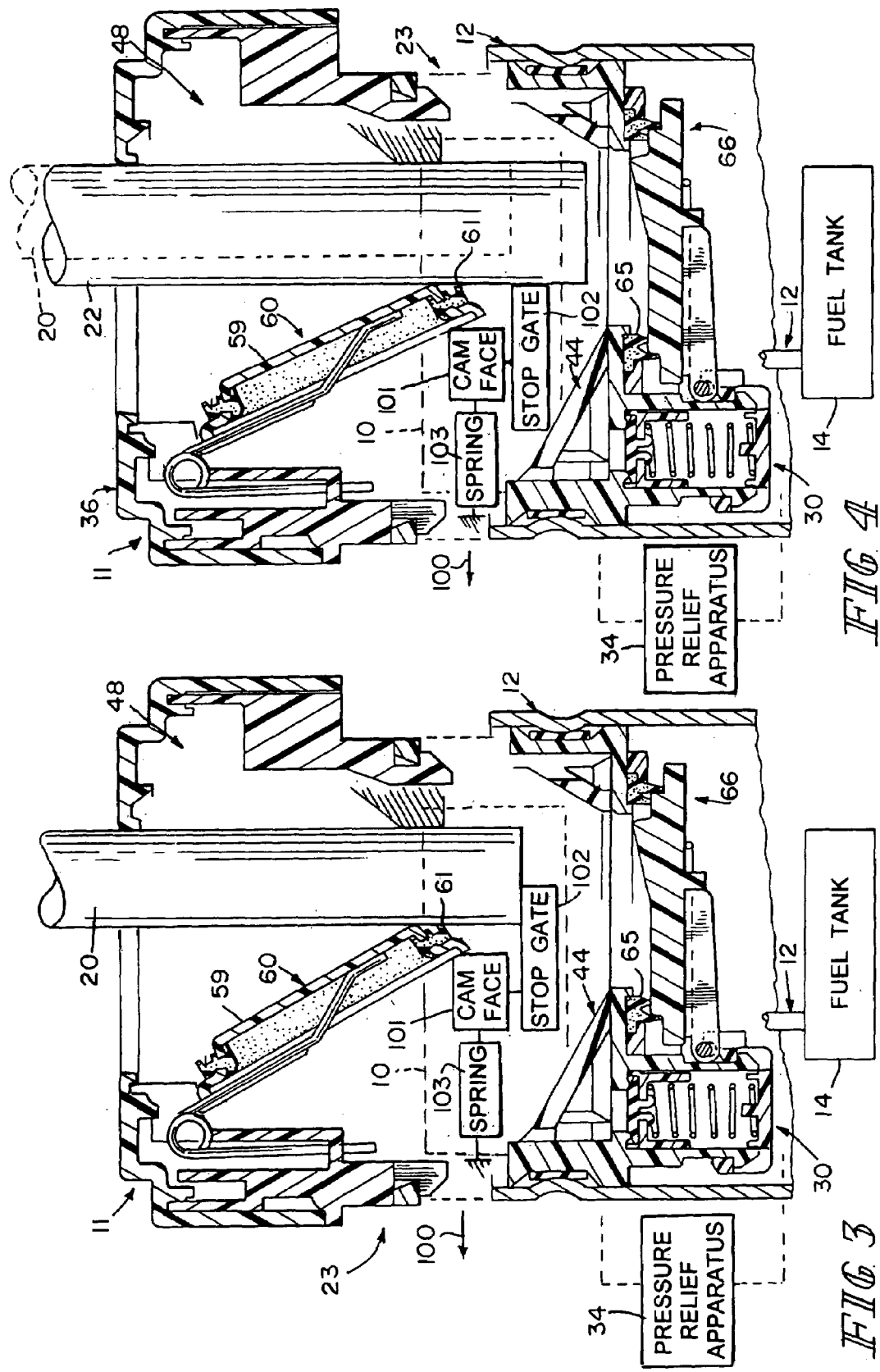

FUEL-DISPENSING NOZZLE INHIBITOR

This application claims priority under 35 U.S.C. § 119(e) to U.S. Provisional Application Ser. No. 60/600,757, filed Aug. 11, 2004, which is expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a motor vehicle powered by a diesel engine. It is customary to use a small-diameter fuel-dispensing nozzle (e.g., 22 mm or less) to dispense unleaded fuel into a fuel tank fill tube and to use a large-diameter fuel-dispensing nozzle (e.g., 26 mm or more) to dispense diesel and leaded fuel into a fill tube.

SUMMARY

A nozzle inhibitor is configured to be coupled to a fuel tank fill tube and arranged to allow only a diesel fuel nozzle having an outer diameter that is greater than a specified minimum diameter to be inserted into the fill tube to a depth sufficient so that a user may dispense diesel fuel from that nozzle into a diesel fuel tank coupled to the fill tube. Such a nozzle inhibitor inhibits insertion of a small-diameter unleaded fuel nozzle into the fill tube of the diesel fuel tank, yet allows a large-diameter diesel fuel nozzle to be inserted into the fill tube of the diesel fuel tank.

In illustrative embodiments, the fill tube includes a filler neck coupled to a fuel tank and a filler neck closure assembly coupled to the filler neck. The nozzle inhibitor is mounted inside the filler neck closure assembly. For example, the nozzle inhibitor is interposed in a space provided in the filler neck closure assembly between a pivotable outer appearance door and a pivotable inner flapper door. The outer appearance door is pivoted through a first pivot angle to a first opened position in response to insertion of the small-diameter unleaded fuel nozzle into the filler neck closure assembly and pivoted through a larger second pivot angle to a second opened position in response to insertion of the large-diameter diesel fuel nozzle into the filler neck closure assembly.

Pivoting motion of the outer appearance door initiated by insertion of a large-diameter diesel fuel nozzle (but not a small-diameter unleaded fuel nozzle) in the fill tube is sufficient to disable the nozzle inhibitor to allow proper insertion of the large-diameter diesel fuel nozzle into the fill tube during tank refueling activities.

In illustrative embodiments, the nozzle inhibitor includes a stop gate positioned in the filler neck closure assembly and arranged to move in a direction generally perpendicular to a longitudinal axis of the filler neck closure assembly between an initial position blocking insertion of the small-diameter unleaded fuel nozzle into the filler neck closure assembly and a retracted position allowing insertion of the large-diameter diesel fuel nozzle into the filler neck closure assembly. The outer appearance door engages the stop gate to move the stop gate to the retracted position as the outer appearance door is pivoted to the second opened position in response to the insertion of the large-diameter diesel fuel nozzle (but not the small-diameter unleaded fuel nozzle) into the filler neck closure assembly.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 3 is a sectional view similar to FIG. 2 showing movement of the small-diameter unleaded fuel nozzle into the filler neck to pivot the outer appearance door about its pivot axis through a first pivot angle to a first opened position and showing movement of the stop gate under a biasing force provided by the spring into the path of the small-diameter unleaded fuel nozzle to engage the tip of the small-diameter unleaded fuel nozzle so that further movement of the small-diameter unleaded fuel nozzle toward the inner flapper door is blocked;

FIG. 4 is a sectional view similar to FIGS. 2 and 3 showing movement of the large-diameter diesel fuel nozzle into the filler neck to pivot the outer appearance door further about its pivot axis through a larger second pivot angle to a second opened position to cause the outer appearance door to urge the cam member against the spring to compress the spring, thereby moving the stop gate coupled to the cam member out of the path of the large-diameter diesel fuel nozzle so that further movement of the large-diameter diesel fuel nozzle toward the inner flapper door is permitted;

DETAILED DESCRIPTION

Figure 1:
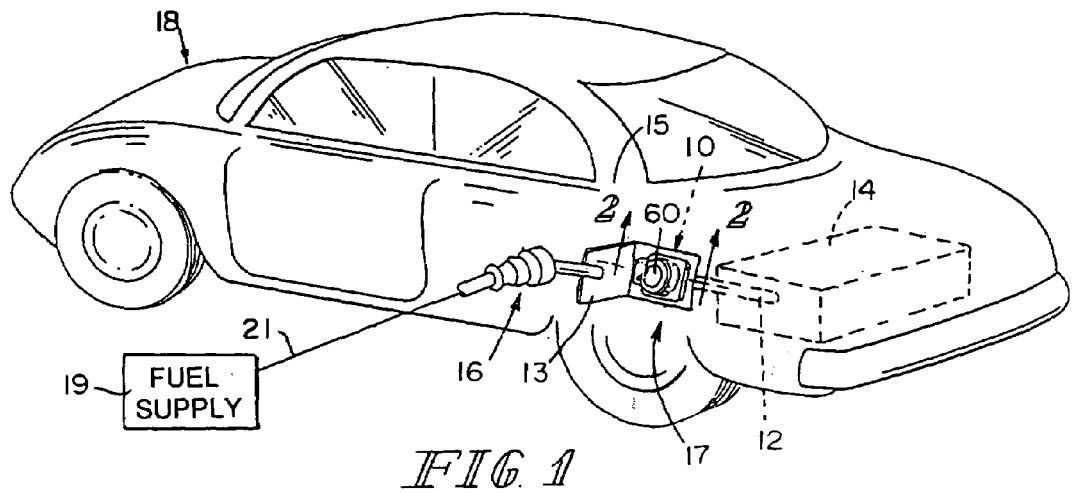
FIG. 1 is a perspective view showing an outer filler neck access door moved to an opened position relative to a vehicle body panel to expose an illustrative filler neck closure assembly coupled to a filler neck leading to a vehicle fuel tank and showing a fuel-dispensing pump nozzle coupled to a fuel supply and configured to be inserted into the filler neck closure assembly during vehicle refueling to discharge liquid fuel into the filler neck leading to the vehicle fuel tank.

A nozzle inhibitor 10 in accordance with a first embodiment of this disclosure is associated with a fill tube 23 coupled to a vehicle fuel tank 14 as suggested in FIGS. 1–4 to prevent a fuel-purchasing customer from using a fuel-dispensing pump nozzle 16 to discharge unleaded fuel into fuel tank 14 of a vehicle 18 having a diesel engine (not shown) requiring only diesel fuel. Nozzle inhibitor 10 is configured to block full insertion of a small-diameter unleaded fuel nozzle 20 into fill tube 23 as suggested in FIG. 3. However, nozzle inhibitor 10 is configured to allow full insertion of a large-diameter diesel fuel nozzle 22 into fill tube 23 as suggested in FIG. 4. In accordance with a second embodiment of the disclosure, full insertion of small-diameter unleaded fuel nozzle 20 into fill tube 23 is blocked by a nozzle inhibitor 210 as suggested in FIG. 5, while full insertion of large-diameter diesel fuel nozzle 22 into fill tube 23 is allowed by nozzle inhibitor 210 as suggested in FIG. 6. Large-diameter diesel fuel nozzle 22 has an outer diameter that is relatively larger than the outer diameter of small-diameter unleaded fuel nozzle 20.

Figure 2:
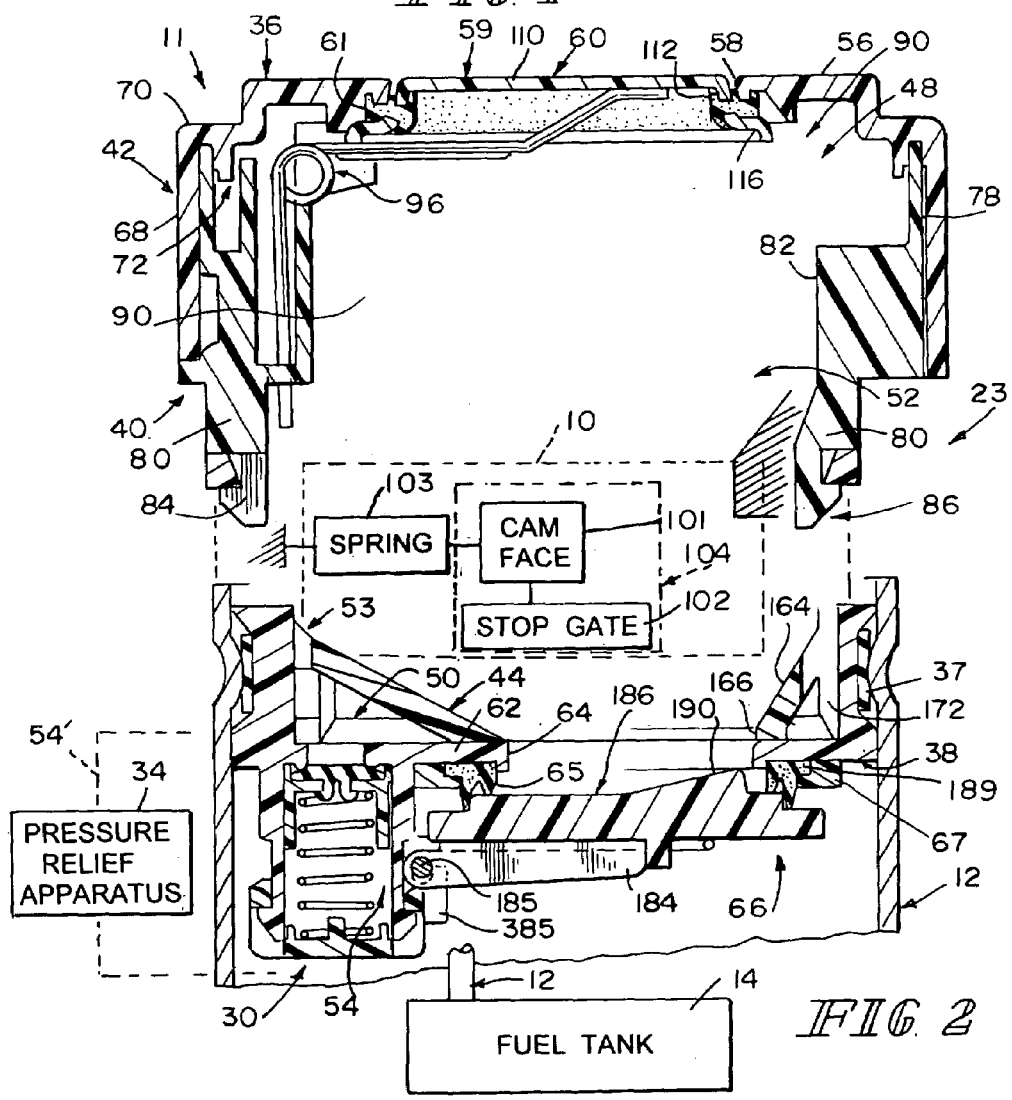
FIG. 2 is a sectional view of the filler neck taken along line 2—2 of FIG. 1 showing an outer appearance door and an inner flapper door in their unpivoted, sealed, closed positions and showing a nozzle inhibitor in accordance with a first embodiment of this disclosure interposed between the outer appearance door and the inner flapper door and provided with a stop gate arranged to limit movement of a small-diameter unleaded fuel nozzle through the filler neck closure assembly to engage the inner flapper door as suggested in FIG. 3 and provided with a cam member coupled to the stop gate and arranged to be moved by a large-diameter diesel fuel nozzle against a spring to move the stop gate out of the path of the large-diameter diesel fuel nozzle to allow the large-diameter diesel fuel nozzle to pivot the inner flapper door to an opened position so that a user can operate the nozzle to dispense fuel through the filler neck into the fuel tank as suggested in FIG. 4.

In an illustrative embodiment, nozzle inhibitor 10 comprises a cam member or face 101, a stop gate 102 coupled to cam member 101 for movement therewith, and a spring 103 arranged to yieldably bias cam member 101 and stop gate 102 to an initial or first position shown, for example, in FIGS. 2 and 3. A unit 104 comprising cam member 101 and stop gate 102 is supported for movement in fill tube 23 between the initial or first position blocking insertion of small-diameter unleaded fuel nozzle 20 into the fill tube 23 as suggested in FIG. 3 and a retracted or second position allowing insertion of large-diameter unleaded fuel nozzle 22 into the fill tube 23 as suggested in FIG. 4. Large-diameter diesel fuel nozzle 22 is sized to move (e.g., pivot) an outer appearance door 59 through a large enough angle to engage and urge unit 104 in a direction 100 against a biasing force of biasing spring 103 to the retracted position. In the embodiment illustrated in FIGS. 2–4, cam member 101 and stop gate 102 are separate pieces which are coupled together to move as unit 104. However, in the embodiment illustrated in FIGS. 5 and 6, cam member 201 is integrally formed with stop gate 202 to form a unit 204.

As used in the specification and claims, the terms "unleaded fuel nozzle," "non-diesel fuel nozzle," and "small-diameter nozzle" are used interchangeably, and the meaning of one term broadly covers the meaning of the other terms. The terms "diesel fuel nozzle," "leaded fuel nozzle," and "large-diameter nozzle" are also used interchangeably, and the meaning of one term broadly covers the meaning of the other terms. As used in the specification and claims, the terms "further insertion" and "full insertion" mean insertion of pump nozzles 16, 20, 22 past respective stop gates 102, 202 toward inner flapper door 66.

As shown in FIG. 1, fill tube 23 includes a filler neck 12 coupled to fuel tank 14 and a filler neck closure assembly 11 coupled to filler neck 12. In the illustrated embodiments, filler neck closure assembly 11 contains nozzle inhibitor 10. However, nozzle inhibitor 10 may very well be mounted directly in filler neck 12. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that assembly 11 is "out of sight" when outer access door 13 is closed. Fuel-dispensing pump nozzle 16 is coupled to a fuel supply 19 by a hose 21 and configured to be inserted into filler neck closure assembly 11 during vehicle refueling to discharge liquid fuel into filler neck 12.

Filler neck closure assembly 11 is assembled as shown, for example, in FIGS. 2–4. Reference is hereby made to U.S. patent application Ser. No. 10/895,593, filed on Jul. 21, 2004 and titled "Closure and Vent System for Capless Filler Neck," which application is hereby incorporated by reference herein, for further details about the configuration and function of filler neck closure assembly 11. In the illustrated embodiment, a vacuum-relief apparatus 30 is included in assembly 11 to provide means for admitting ambient air into filler neck 12 whenever certain predetermined vacuum conditions develop in fuel tank 14 and filler neck 12. Assembly 11 may include a pressure-relief apparatus 34 (alone or in tandem with vacuum-relief apparatus 30) to discharge excess pressurized fuel vapor from filler neck 12 through assembly 11 to the surroundings.

As suggested in FIGS. 2–4, filler neck closure assembly 11 includes a housing 36 adapted to be coupled to a mouth of filler neck 12 in the manner shown, for example, in FIG. 2. A sealing gasket 37 is interposed between housing 36 and filler neck 12 to establish a sealed connection therebetween.

In the illustrated embodiment, housing 36 comprises a base 38, an outer body 40 coupled to base 38, and an outer shell 42 coupled to outer body 40. Outer shell 42 includes a top wall 56, an annular skirt 68, and an L-shaped upper portion 70 interconnecting top wall 56 and annular skirt 68. Means 72 is appended to an underside of upper portion 70 for coupling outer shell 42 to outer body 40.

Assembly 11 includes a partition 44 mounted, for example, in a cavity formed in base 38 to lie in an interior region 48 formed in housing 36 between base 38 and outer body 40. Partition 44 is arranged as shown, for example, in FIG. 4 to divide interior region 48 into an inner vent chamber 50 below partition 44 and an outer vent chamber 52 above partition 44. Partition 44 and base 38 cooperate to form channel means 53 for conducting air and/or fuel vapor between inner and outer vent chambers 50, 52 when partition 44 is mounted in interior region 48 to define inner and outer chambers 50, 52. Partition 44 is arranged to shield components defining vacuum-relief apparatus 30 and pressure-relief apparatus 34 from any contaminant material inadvertently introduced into outer vent chamber 52.

As suggested in FIG. 2, housing 36 also includes a vent passage 54 and/or 54' having an outer end opening into inner vent chamber 50 located in interior region 48 and an inner end adapted to open into fuel tank filler neck 12 when housing 36 is coupled to filler neck 12. A flow control valve assembly such as vacuum-relief apparatus 30 or pressure-relief apparatus 34 can be placed in vent passage 54 or 54' to regulate the flow of gas (e.g., air or fuel vapor) through vent passage 54 of 54'.

Housing 36 is adapted to be coupled to fuel tank filler neck 12 to receive pump nozzles 16, 20, 22 during refueling of fuel tank 14. Top wall 56 is formed to include an outer nozzle-receiving aperture 58 normally closed by an outer closure 60. As suggested in FIGS. 2–4, outer closure 60 includes an outer appearance door 59 mounted for pivotable movement relative to outer body 40 and a seal member 61 carried by outer appearance door 59. Outer appearance door 59 is configured to be moved (e.g., pivoted) by pump nozzles 16, 20, 22 to assume an opened position during refueling. A torsion spring 96 is provided to bias outer appearance door 59 normally and yieldably to the closed position. When outer closure 60 is moved to assume the closed position, outer appearance door 59 occludes outer nozzle-receiving aperture 58 and seal member 61 establishes a sealed connection between outer appearance door 59 and top wall 56 of outer shell 42.

Outer appearance door 59 is pivoted through a first pivot angle to a first opened position in response to insertion of small-diameter unleaded fuel nozzle 20 into filler neck closure assembly 11 as suggested in FIG. 3. Outer appearance door 59 is pivoted through a larger second pivot angle to a second opened position in response to insertion of large-diameter diesel fuel nozzle 22 into filler neck closure assembly 11 as suggested in FIG. 4.

Housing 36 includes a bottom wall 62 provided, for example, on base 38 and formed to include an inner nozzle-receiving aperture 64 normally closed by an inner flapper door 66. Flapper door 66 is arranged to be moved (e.g., pivoted) by large-diameter diesel fuel nozzle 22 (but not by small-diameter unleaded fuel nozzle 20) to assume an opened position during refueling operation as suggested in FIG. 4. As also suggested in FIG. 2, an annular seal 65 is configured to mate with flapper door 66 upon movement of flapper door 66 to the closed position. A torsion spring (not shown) is provided to bias inner flapper door 66 normally and yieldably to the closed position. A seal retainer 67 is coupled (e.g., welded) to base 38 to retain annular seal 65 in a position surrounding inner nozzle-receiving aperture 64 and engaging flapper door 66 upon movement of flapper door 66 to assume the closed position.

Nozzles 16, 20, or 22 are movable through outer nozzle-receiving aperture 58 to move outer appearance door 59 to an opened position and then though pump nozzle-receiving passageway 48 formed in an interior region of housing 36 as suggested in FIGS. 3 and 4. In addition, in the case of large-diameter diesel fuel nozzle 22, large-diameter diesel fuel nozzle 22 is movable through pump nozzle-receiving passageway 48 and then through inner nozzle-receiving aperture 64 to move inner flapper door 66 to an opened position during fuel tank refueling.

Outer body 40 includes an outer side wall 78 sized to fit in and mate with annular skirt 68 of outer shell 42, a lower rim 80 including an annular inner side wall 82 extending upwardly toward top wall 56 of outer shell 42, several small fasteners 84 extending downwardly from lower rim 80, and one large fastener 86 also extending downwardly from lower rim 80 as suggested in FIG. 2. A spaced-apart pair of pivot mounts is coupled to annular inner side wall 82 and arranged to extend into a cavity 90 formed in outer body 40 to support a pair of pivot arms appended to an underside of outer appearance door 59 so that outer appearance door 59 is able to pivot about a pivot axis extending through the pivot arms as outer appearance door 59 moves between the closed position shown in FIG. 2 and the opened position shown in FIGS. 3 and 4. A spring mount is also provided in cavity 90 of outer body 40 and located midway between the pivot mounts to receive a portion of a torsion spring 96 provided to bias outer appearance door 59 normally to assume the closed position shown in FIG. 2.

Outer appearance door 59 in the illustrative embodiment is made of a plastics material and includes a round top wall 110, an annular upright wall 112 depending downwardly from a perimeter edge of top wall 110 and formed to include a plurality of circumferentially spaced-apart tether-receiving holes, and an annular lateral wall 116 extending radially outwardly from a lower perimeter edge of annular upright wall 112. Seal member 61 is over-molded onto appearance door 59 to produce outer closure 60.

In the illustrated embodiment, partition 44 includes a funnel 164 formed to include an outlet aperture 166 in alignment with inner nozzle-receiving aperture 64 formed in bottom wall 62 of housing 36. An upper surface of funnel 164 defines a lower boundary of outer vent chamber 52. A lower surface of funnel 164 defines an upper boundary of inner vent chamber 50. Partition 44 further includes a funnel support 172 coupled to an upper portion of funnel 164 and arranged to engage a portion of side and bottom walls of base 38 to support funnel 164 in interior region 48 of housing 36. As suggested in FIG. 2, funnel support 172 is coupled to funnel 164 and to base 38 to cause outer vent chamber 52 to lie above funnel 164 and inner vent chamber 50 to lie below funnel 164. At least one of funnel 164 and funnel support 172 is formed to include vent channel means 53. In one embodiment, the upper portions of funnel 164 and funnel support 172 are formed to include a series of spaced-apart notches which cooperate to define vent channel means 53 for allowing the flow of air and/or fuel vapor between inner and outer vent chambers 50, 52.

As shown in FIG. 2, annular seal 65 is arranged to contact inner flapper door 66 upon movement of flapper door 66 to the closed position to establish an annular seal between housing 36 and flapper door 66. An underside of flapper door 66 includes a pair of pivot arms 184 arranged to pivot on a pivot shaft 185. Base 38 of housing 36 includes a pair of shaft mounts 385 as shown, for example, in FIG. 2. Each shaft mount 385 is adapted to be coupled to pivot shaft 185 to support pivot shaft 185 for pivoting movement relative to shaft mounts 385. Inner flapper door 66 further includes a raised dome 186 including a top wall facing toward a bottom wall 62 of base 38 and an annular side wall extending in a direction away from bottom wall 62, and a dome support interposed between pivot arms 184 and raised dome 186. Annular seal 65 also includes an annular flange 189 gripped by seal retainer 67. An inclined nozzle-engaging surface 190 is appended to raised dome 186 to contact large-diameter diesel fuel nozzle 22 during opening of inner flapper door 66.

Filler neck closure assembly 11 is shown in FIGS. 1 and 2 just before a pump nozzle operator begins to pump fuel into fuel tank filler neck 12. Nozzle inhibitor 10 is provided in filler neck closure assembly 11 to block that operator from pumping unleaded fuel into fuel tank 14 of vehicle 18 having a diesel engine. Outer appearance door 59 and inner flapper door 66 are biased to assume their unpivoted, sealed, closed positions. Nozzle inhibitor 10 is interposed between outer appearance door 59 and inner flapper door 66. Nozzle inhibitor 10 is provided with stop gate 102 arranged to limit movement of small-diameter unleaded fuel nozzle 20 in filler neck 12 as suggested in FIG. 3 and with cam member 101 coupled to stop gate 102 and arranged to be moved by large-diameter diesel fuel nozzle 22 against a biasing force of spring 103 to disable stop gate 102 as suggested in FIG. 4.

Insertion of small-diameter unleaded fuel nozzle 20 into filler neck 12 to pivot outer appearance door 59 about its pivot axis through a first pivot angle to a first opened position is shown, for example, in FIG. 3. Under a biasing force provided by spring 103, stop gate 102 is moved to the initial position into the path of small-diameter unleaded fuel nozzle 20 to engage the tip of small-diameter unleaded fuel nozzle 20 so that further movement of small-diameter unleaded fuel nozzle 20 toward inner flapper door 66 is blocked. Insertion of large-diameter diesel fuel nozzle 22 into filler neck 12 to pivot outer appearance door 59 further about its pivot axis through a larger second pivot angle to a second opened position is shown, for example, in FIG. 4. This causes appearance door 59 to urge cam member 101 against biasing spring 103 to compress spring 103, thereby moving stop gate 102 (coupled to cam member 101) out of the path of large-diameter diesel fuel nozzle 22 so that further movement of large-diameter diesel fuel nozzle 22 toward inner flapper door 66 is permitted.

Figure 5:
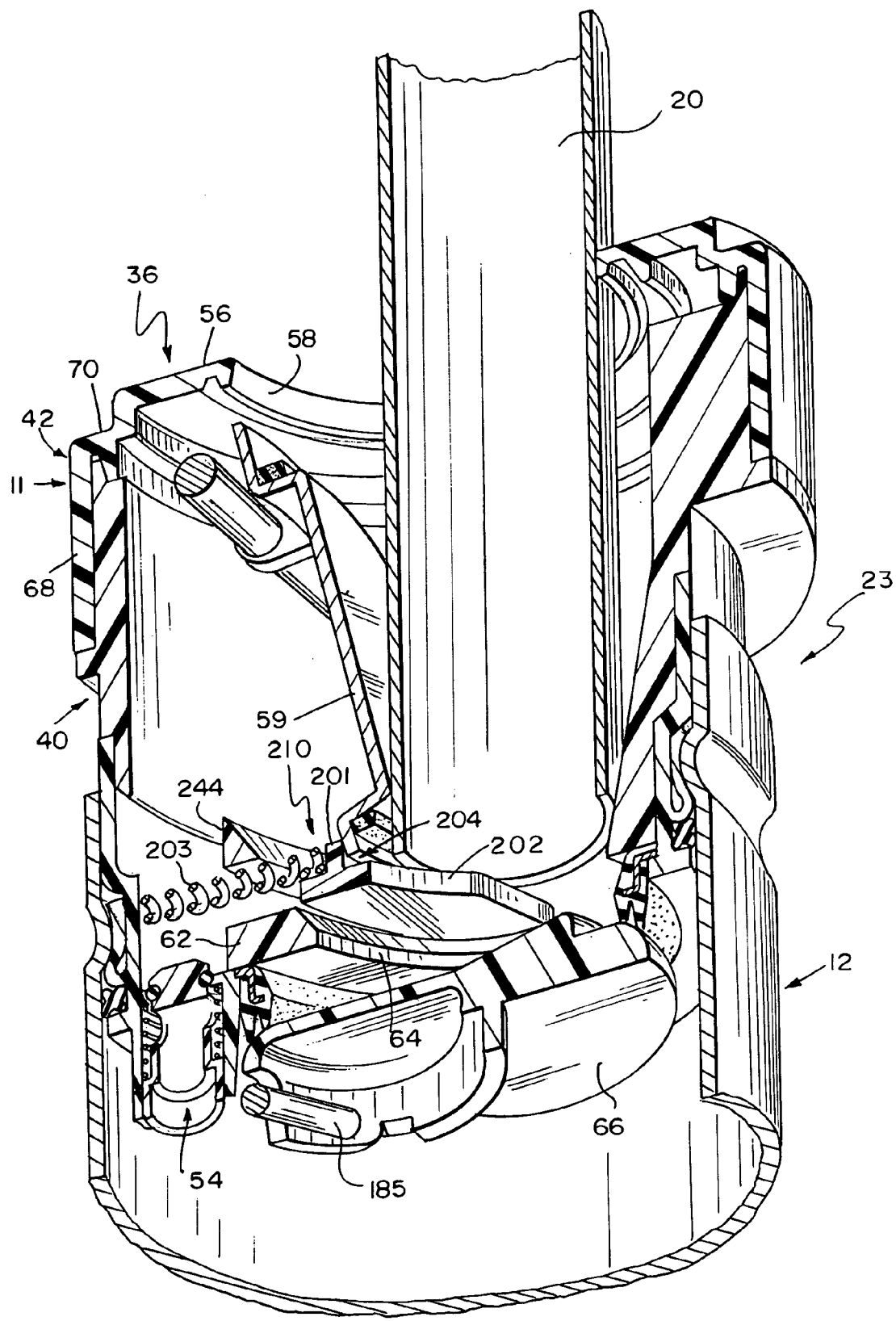
FIG. 5 is a perspective view, with portions broken away, of a nozzle inhibitor in accordance with a second embodiment of this disclosure and having a stop gate interposed between the outer appearance door and the inner flapper door, and showing movement of the small-diameter unleaded fuel nozzle into the filler neck to pivot the outer appearance door to the first opened position and movement of the stop gate under the biasing force of the spring into the path of the small-diameter unleaded fuel nozzle to engage a tip of the unleaded fuel nozzle to block further movement of the small-diameter unleaded fuel nozzle toward the inner flapper door.
Figure 6:
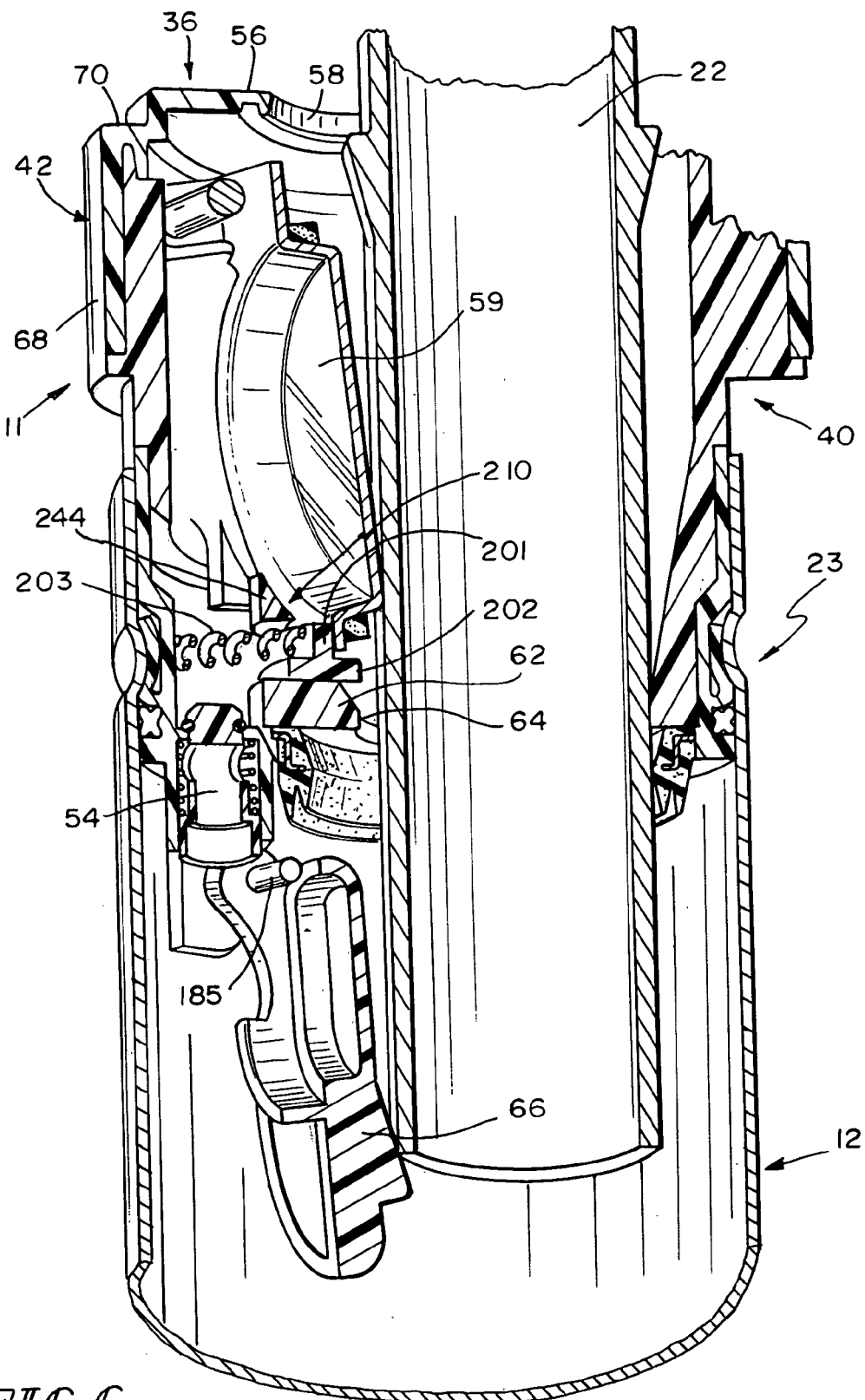
FIG. 6 is a perspective view similar to FIG. 5 showing movement of the large-diameter diesel fuel nozzle into the filler neck to pivot the outer appearance door to the second opened position and movement of the stop gate against the spring out of the path of the large-diameter diesel fuel nozzle so that further movement of the large-diameter diesel fuel nozzle toward the inner flapper door is permitted.

In accordance with the second embodiment of this disclosure illustrated in FIGS. 5 and 6, nozzle inhibitor 210 comprises a cam member or face 201, a stop gate 202 coupled to cam member 201 for movement therewith, and a spring 203 arranged to yieldably bias cam member 201 and stop gate 202 to an initial or first position as suggested in FIG. 5 in the path of small-diameter unleaded fuel nozzle 20 to engage the tip of small-diameter unleaded fuel nozzle 20 as it is inserted into fill tube 23 to block further movement of small-diameter unleaded fuel nozzle 20 toward inner flapper door 66. In the embodiment illustrated in FIGS. 5 and 6, cam member 201 is integrally formed with stop gate 202. A unit 204 comprising cam member 201 and stop gate 202 is supported for movement in fill tube 23 between the initial or first position as suggested in FIG. 5 and a retracted or second position allowing insertion of large-diameter unleaded fuel nozzle 22 into the fill tube 23 as suggested in FIG. 6.

Nozzle inhibitor 210 includes means for supporting reciprocating movement of unit 204 comprising cam member 201 and stop gate 202 in a direction generally perpendicular to the direction of insertion of pump nozzles 16, 20, 22 into fill tube 23. In the illustrated embodiment, the supporting means includes a partition member 244 and bottom wall 62 of housing 36. Unit 204 is supported for reciprocating movement between the initial or first position suggested in FIG. 5 and a retracted or second position suggested in FIG. 6 between a lower surface of partition member 244 and an upper surface of bottom wall 62 of housing 36.

As large-diameter diesel fuel nozzle 22 is inserted into filler neck closure assembly 11 in the manner suggested in FIG. 6, cam member 201 is arranged to be engaged and moved by outer appearance door 59 against a biasing force of biasing spring 203 to move unit 204 comprising cam member 201 and stop gate 202 to the retracted position out of the path of large-diameter diesel fuel nozzle 22 so that further movement of large-diameter diesel fuel nozzle 22 toward inner flapper door 66 is permitted. While cam member 201 is integrally formed with stop gate 202 in the embodiment illustrated in FIGS. 5 and 6, cam member 101 and stop gate 102 are separate pieces which are coupled together in the embodiment illustrated in FIGS. 2–4.

In the illustrated embodiments of FIGS. 2–6, filler neck closure assembly 11 provides a housing for nozzle inhibitors 10, 210 as suggested in FIGS. 2–6. It is within the scope of this disclosure to mount nozzle inhibitors 10, 210 either in filler neck closure assembly 11 (which incorporates other features like outer appearance door 59, inner flapper door 66, vacuum-relief valve 30, pressure-relief valve 34, sealing gaskets 37, 61, 65, etc.) or in filler neck 12. A simple mounting bracket or plate may be used for supporting stop gates 102, 202 in filler neck colure assembly 11 or in filler neck 12. The means for supporting stop gates 102, 202 allows them to move in a direction generally perpendicular to the direction of insertion of nozzles 16, 20, 22 into filler neck 12 and, at the same time, limit their movement to this direction only.

The invention claimed is:

1. A nozzle inhibitor apparatus comprising
 a fill tube adapted to be coupled to a fuel tank of a motor vehicle having a diesel engine, the fill tube having a nozzle-receiving aperture normally closed by an outer door mounted for movement relative to the fill tube between aperture-closing and aperture-opening positions, the outer door being arranged to be moved to an opened position by a nozzle inserted through the nozzle-receiving aperture, and
 means positioned in the fill tube and responsive to movement of the outer door for preventing insertion of a small-diameter unleaded fuel nozzle into the fill tube while allowing insertion of a large-diameter diesel fuel nozzle into the fill tube.

2. The apparatus of claim 1, wherein the fill tube includes a filler neck coupled to the fuel tank and a filler neck closure assembly coupled to the filler neck, the filler neck closure assembly includes a housing having an outer nozzle-receiving aperture normally closed by the outer door and an inner nozzle-receiving aperture normally closed by a pivotable inner door, and the preventing means is located in the filler neck closure assembly between the outer door and the pivotable inner door.

3. The apparatus of claim 2, wherein the preventing means includes a stop gate and a cam member coupled to the stop gate, a unit comprising the stop gate and the cam member coupled thereto is movable in a direction generally perpendicular to a longitudinal axis of the filler neck closure assembly between a first position blocking insertion of the unleaded fuel nozzle into the filler neck closure assembly past the stop gate and a second position allowing insertion of the diesel fuel nozzle into the filler neck closure assembly past the stop gate, and the pivotable outer door engages the cam member to move the unit to the second position as the pivotable outer door moves to an opened position in response to the insertion of the large-diameter diesel fuel nozzle into the filler neck closure assembly through the outer nozzle-receiving aperture.

4. The apparatus of claim 3, wherein the preventing means includes means for supporting movement of the unit in the generally perpendicular direction between the first and second positions.

5. The apparatus of claim 4, wherein the supporting means includes a partition member and a bottom wall of the housing and the unit is supported for reciprocating movement between the first and second positions between a lower surface of the partition member and an upper surface of the bottom wall.

6. The apparatus of claim 1, wherein the preventing means includes a stop gate and a cam member coupled to the stop gate, a unit comprising the stop gate and the cam member coupled thereto is movable in a direction generally perpendicular to a longitudinal axis of the fill tube between a first position blocking insertion of the unleaded fuel nozzle into the fill tube past the stop gate and a second position allowing insertion of the diesel fuel nozzle into the fill tube past the stop gate, the door engages the cam member to move the unit to the second position as the door moves to an opened position in response to the insertion of the large-diameter diesel fuel nozzle into the fill tube through the outer nozzle-receiving aperture.

7. The apparatus of claim 6, wherein the cam member is integrally formed with the stop member.

8. The apparatus of claim 7, wherein the preventing means includes a spring biasing the unit to the first position, and the door engages the cam member to move the unit to the second position against the biasing spring as the door moves to an opened position in response to the insertion of the large-diameter diesel fuel nozzle into the fill tube through the outer nozzle-receiving aperture.

9. The apparatus of claim 1, wherein the preventing means includes a stop gate arranged normally to intercept and block further movement of a small-diameter unleaded fuel nozzle moving into the fill tube and a cam face located between the nozzle-receiving aperture formed in the fill tube and the stop gate and arranged to lie in an intercept position to intercept the outer door as the outer door is being moved by a large-diameter diesel fuel nozzle moving into the fill tube and wherein the stop gate is coupled to the cam face for movement therewith relative to the fill tube.

10. The apparatus of claim 9, wherein the preventing means further includes spring means for yieldably urging the cam face toward the intercept position.

11. A nozzle inhibitor apparatus comprising
a fill tube adapted to be coupled to a fuel tank of a motor vehicle having a diesel engine, the fill tube having a nozzle-receiving aperture normally closed by a door mounted for movement relative to the fill tube between aperture-closing and aperture-opening positions, the door being arranged to be moved to an opened position by a nozzle inserted through the nozzle-receiving aperture,
a stop gate, and
a cam member coupled to the stop gate, a unit comprising the stop gate and the cam member coupled thereto being positioned in the fill tube and movable in a direction generally perpendicular to a longitudinal axis of the fill tube between a first position blocking insertion of a small-diameter unleaded fuel nozzle into the fill tube past the stop gate and a second position allowing insertion of a large-diameter diesel fuel nozzle into the fill tube past the stop gate, the door engaging the cam member to move the unit to the second position as the door moves to an opened position in response to the insertion of the large-diameter diesel fuel nozzle, but not the small-diameter unleaded fuel nozzle, into the fill tube through the outer nozzle-receiving aperture.

12. The apparatus of claim 11, wherein the cam member is integrally formed with the stop member.

13. The apparatus of claim 11, further comprising a spring biasing the stop gate and the cam member coupled thereto to the first position and wherein the door engages the cam member to move the unit to the second position against the biasing spring as the door moves to an opened position in response to the insertion of the large-diameter diesel fuel nozzle into the fill tube through the outer nozzle-receiving aperture.

14. The apparatus of claim 11, wherein the fill tube includes a filler neck coupled the fuel tank and a filler neck closure assembly coupled to the filler neck, the filler neck closure assembly includes a housing having an outer nozzle-receiving aperture normally closed by a pivotable outer door and an inner nozzle-receiving aperture normally closed by a pivotable inner door, the unit is positioned in the filler neck closure assembly between the pivotable outer door and the pivotable inner door, and the pivotable outer door engages the cam member to move the unit to the second position as the pivotable outer door pivots to an opened position in response to the insertion of the large-diameter diesel fuel nozzle into the filler neck closure assembly through the outer nozzle-receiving aperture.

15. The apparatus of claim 14, wherein the insertion of the small-diameter unleaded fuel nozzle into the filler neck pivots the pivotable outer door through a first pivot angle to a first opened position, and the insertion of the diesel fuel nozzle into the filler neck pivots the pivotable outer door through a second pivot angle larger than the first pivot angle to a second opened position.

16. The apparatus of claim 14, further comprising means for supporting movement of the unit in the generally perpendicular direction between the first and second positions.

17. The apparatus of claim 16, wherein the supporting means includes a partition member and a bottom wall of the housing and the unit is supported for reciprocating movement between the first and second positions between a lower surface of the partition member and an upper surface of the bottom wall.

18. A nozzle inhibitor apparatus comprising
a fill tube including a filler neck coupled to a fuel tank of a motor vehicle having a diesel engine and a filler neck closure assembly coupled to the filler neck, the filler neck closure assembly including a housing having an outer nozzle-receiving aperture normally closed by a pivotable outer door and an inner nozzle-receiving aperture normally closed by a pivotable inner door,
a stop gate, and
a cam member coupled to the stop gate, a unit comprising the stop gate and the cam member coupled thereto being positioned in the filler neck closure assembly and movable in a direction generally perpendicular to a longitudinal axis of the filler neck closure assembly between a first position blocking insertion of a small-diameter unleaded fuel nozzle into the fill tube past the stop gate and a second position allowing insertion of a large-diameter diesel fuel nozzle into the fill tube past the stop gate, and
a spring biasing the unit to the first position, the pivotable outer door engaging the cam member to move the unit to the second position against the biasing spring as the pivotable outer door moves to an opened position in response to the insertion of the large-diameter diesel fuel nozzle, but not the small-diameter unleaded fuel nozzle, into the filler neck through the outer nozzle-receiving aperture.

19. The apparatus of claim 18, wherein the stop gate is movable in a direction generally perpendicular to a longitudinal axis of the filler neck closure assembly between the first and second positions.

20. The apparatus of claim 18, further comprising means for supporting movement of the unit in the generally perpendicular direction between the first and second positions.

21. The apparatus of claim 20, wherein the supporting means includes a partition member and a bottom wall of the housing and the unit is supported for reciprocating movement between the first and second positions between a lower surface of the partition member and an upper surface of the bottom wall.

22. A nozzle inhibitor apparatus comprising
a fill tube formed to include a nozzle-receiving passageway extending between an outer nozzle-receiving opening and an inner nozzle-receiving opening, the fill tube further including an outer appearance door arranged normally to close the outer nozzle-receiving opening and an inner flapper door arranged to normally close the inner nozzle-receiving opening,
a stop gate mounted for movement in the nozzle-receiving passageway,
a spring arranged to urge the stop gate into a path of a small-diameter unleaded fuel nozzle that has been moved relative to the fill tube to pivot the outer appearance door about a pivot axis through a first pivot angle to a first opened position to engage a tip of the small-diameter unleaded fuel nozzle so that further movement of the small-diameter unleaded fuel nozzle toward the inner flapper door is blocked, and
a cam face coupled to the stop gate and arranged to be moved by the outer appearance door against the spring to disable the stop gate, the cam face being located in the nozzle-receiving passageway to intercept the outer appearance door as the outer appearance door is being moved by a large-diameter diesel fuel nozzle having a relatively large diameter than the small-diameter unleaded fuel nozzle relative to the fill tube about the pivot axis through a larger second pivot angle to a second opened position to cause the outer appearance door to urge the cam face against the spring to compress the spring, thereby moving the stop gate in the nozzle-receiving passageway out of the path of the large diameter diesel fuel nozzle so that further movement of the large diameter diesel fuel nozzle to engage and move the inner flapper door from a normally closed position to an opened position admitting the large diameter diesel fuel nozzle into the inner nozzle-receiving opening.

* * * * *